United States Patent [19]
Henkel

[11] Patent Number: 5,230,580
[45] Date of Patent: Jul. 27, 1993

[54] BALL JOINT

[75] Inventor: Günther Henkel, Dusseldorf, Fed. Rep. of Germany

[73] Assignee: TRW Ehrenreich GmbH & Co. KG, Dusseldorf, Fed. Rep. of Germany

[21] Appl. No.: 855,070

[22] Filed: Mar. 23, 1992

[30] Foreign Application Priority Data

Mar. 23, 1991 [DE] Fed. Rep. of Germany ....... 4109697

[51] Int. Cl.$^5$ .................................. F16C 11/10
[52] U.S. Cl. ........................... 403/135; 403/131; 403/141; 403/144; 29/453; 29/451; 384/206
[58] Field of Search ................ 403/131–133, 403/136, 137, 138, 144, 135, 140–141; 29/898.046, 453, 451; 384/206, 209, 213

[56] References Cited

U.S. PATENT DOCUMENTS

| 2,365,552 | 12/1944 | Hill ............................ 403/131 X |
| 2,838,330 | 6/1958 | Fidler ......................... 403/138 X |
| 3,014,767 | 12/1961 | Thrasher et al. . |
| 3,317,256 | 5/1967 | Ernest ...................... 29/898.046 X |
| 3,535,006 | 10/1970 | Orkin et al. ................... 384/206 |
| 3,843,272 | 10/1974 | Jorn ................................ 403/132 |
| 4,035,094 | 7/1977 | Herbenar ....................... 403/144 |
| 4,163,617 | 8/1979 | Nemoto ..................... 403/144 X |
| 4,634,298 | 1/1987 | Crawford ...................... 384/209 |
| 4,790,682 | 12/1988 | Henkel .......................... 403/140 |

FOREIGN PATENT DOCUMENTS

| 2062475 | 6/1972 | Fed. Rep. of Germany . |
| 2831470C2 | 12/1982 | Fed. Rep. of Germany . |
| 3502233C1 | 6/1986 | Fed. Rep. of Germany . |
| 709337 | 5/1931 | France .......................... 403/133 |
| 1076353 | 10/1954 | France .......................... 384/206 |
| 2634839 | 2/1990 | France . |
| 2100337 | 12/1982 | U.S.S.R. . |
| 562391 | 6/1944 | United Kingdom ............. 384/213 |

Primary Examiner—Randolph A. Reese
Assistant Examiner—Harry C. Kim
Attorney, Agent, or Firm—Tarolli, Sundheim & Covell

[57] ABSTRACT

The invention concerns a ball joint with a ball (6) arranged in a joint housing (1), with at least one bearing shell arranged between the joint housing (1) and the ball (6) and with at least one thrust collar (14) arranged between the joint housing (1) and the bearing shell, whereby the thrust collar adjoins the outer surface (11) of the bearing shell and braces the same in the axial direction of the inner space (2) of the joint housing. A consistent bracing of the joint after automated mounting is obtained by the fact that the thrust collar (14) is an elastic metal ring with a generally U-shaped cross section and with two ring limbs (17,18) that form one stopping face (15,16) each, and with a ring web (19) connecting the ring limbs (17,18) to each other.

17 Claims, 4 Drawing Sheets

BALL JOINT

TECHNICAL FIELD

The invention concerns a ball joint with a ball arranged in a joint housing, at least one bearing shell arranged between the joint housing and the ball and with at least one thrust collar arranged between the joint housing and the bearing shell, whereby the thrust collar adjoins the outer surface of the bearing shell and braces it in the axial direction of the inner space of the joint housing.

BACKGROUND OF THE INVENTION

Ball joints of this sort are known from the current state of technology. The DE-PS 35 02 233 describes an example of a ball joint in which the inner space of the housing serves as receptacle for a ball, that is comprised of two bearing shells, made of a hard elastic plastic, that are inserted between the joint housing and the ball and two thrust collars, made of a soft elastic plastic, that adjoin the outer surface of the bearing shells with their inner surface. The bearing shells have surfaces conically tapered towards the outer portion of the joint, in the contact area of the thrust collars, whereby the thrust collars, with their concave curved outer surface brace themselves on these conically tapered surfaces. In all these previously mentioned ball joints the thrust collars, which preferably consist of polyurethane, are deformed during the mounting process by pressure in the axial direction until the required bracing of the joint is obtained. The formed elastic collars thus serve for the production of the necessary tension in the joint, as well as for the equalization of the tolerances occurring in the ball joint. The previously mentioned ball joints have proven themselves in practical application. However, such polyurethane collars can lead to an undesired change of the axial pressure after they have been mounted. These changes are primarily caused by a material flow in the existing hollow spaces. This also leads to a reduction in the frictional values and the bracing of the joints, but the elasticity of the joint is increased.

Another ball joint is known from the DE-PS 28 31 470, in which end pieces in the shape of spherical zones are connected with a rubber body in a bonding manner and the rubber body is connected in a bonding manner with a spherical inner portion that is provided with two cylindrical mounting ends on the inner side and with a cylindrical center section of a housing on the outer side. The end pieces are secured against rotation opposite the housing and act like thrust collars with webs that adjoin the bearing shell and extend transversely to the axial direction of the housing, as well as with two limbs bent off the same. The forces that brace the joint in the axial direction are introduced into one of the two limbs.

One disadvantage of this previously mentioned ball joint is the fact that the end pieces that act as thrust collars are not formed elastic, so that the bracing of the joint is influenced by the inherent elasticity of the end pieces. Possible wear and tear of the ball joint is thus not equalized by the end pieces or the spherical inner portion.

The DE-OS 20 62 475 describes one further ball joint comprised of an inner ring with a spherical outer surface and an outer ring with a correspondingly spherical inner surface that serves as receptacle for the inner ring.

SUMMARY OF THE INVENTION

Originating from this state of technology, the invention is based on the objective of creating a ball joint that maintains an equal bracing of the joint after the mounting, can be easily mounted in an automated manner and is able to equalize possible tolerances between the joint housing and the bearing shell or the ball.

The technical solution of this objective suggests a ball joint of this type in which the pressure ring is a formed elastic metal profile ring comprising a ring web arranged at an angle to the axial direction of the inner space of the joint housing and forming a contact surface, and two ring limbs bent off radially (outward) from this ring web within an axial distance to each other, whereby the forces that brace the joint are applied in such a way that the bracing is influenced by the inherent elasticity of the thrust collar.

The ball joint according to the invention provides the advantage that the inserted metal ring will only give way to potential axial pressures to a limited extent after the mounting, so that the bracing of the joint and the frictional values are not decreased. Furthermore, the elasticity of the joint in the ball joint according to the invention remains constant over a long period of time. The mounting of the ball joint according to the invention can be executed much easier compared to the previously mentioned ball joints with polyurethane thrust collars, since the higher stability of the steel thrust collar allows simpler automatization of the mounting process; mounting is also made possible if the free space in the joint is smaller than the collar volume caused by the sum of incurring tolerances. The ball joint according to the invention also provides the advantage that the utilization of a smaller portion of plastic in the ball joint will have ecological effects in terms of disposal of used and/or defective ball joints, which will be a considerable factor in regard to production costs of such ball joints in the future.

In order to reduce the production costs of the ball joint according to the invention, it is suggested that the thrust collar is manufactured using steel.

According to a first example of the invention, the inner space of the joint housing, which is constructed cylindrically over part of its axial length, has a conically shaped end area, whereby a first bearing-shell half adjoins this end area with a correspondingly conical surface. This example also suggests that the ball is braced at the axially opposite end of the inner space of the joint housing by a thrust collar, whereby a second bearing-shell half is arranged in between. In this example of the ball joint according to the invention it is particularly advantageous that the mounting can be automated in a simple manner, since the ball that was inserted into the bearing-shell half is inserted into the inner space of the joint housing together with the same, adjoins the conically shaped end area of the inner space of the joint housing and is subsequently braced with the attached thrust collar. This first example of the ball joint excels by a low number of structural elements.

In a second example of the ball joint according to the invention, it is suggested that the ball is retained by two steel thrust collars arranged in the two axially opposing end areas of the cylindrical inner space of the joint housing.

In order to fix the position of the thrust bearings exactly, both examples of the ball joint according to the invention suggest that the inner space of the joint housing is provided with annular grooves on its inner periphery, into which at least one ring limb of the thrust collar or the thrust collars interlocks with its free end. A further development of the ball joint suggests that the angle, α, at which the ring web is arranged to the axial direction of the inner space of the joint housing slightly fluctuates from the angle, β, between the axial direction and the outer surface of the bearing-shell half in the contact area. The effect of this form of construction is that the mounting pressure extending in the axial direction expands the collar over the slope of the ball shell and thus brings the same into its final position, in which the thrust collar adjoins the outer surface of the bearing shell with the web that connects the limbs. The expansion of the thrust collar exposes the thrust collar to pretension, so that the desired bracing of the joint can be obtained in the joint housing by means of the thrust collar. The arrangement angle, α, of the ring web is preferably slightly larger than the inclination angle, β, of the outer surface of the bearing-shell half, whereby the difference between the angles amounts to 1° in one preferred example.

The required elasticity of the thrust collar in the axial, as well as radial, direction is obtained by the fact that the thrust collar is provided with a number of slots extending in the axial direction on the end that faces the bearing shell.

A further improvement of the elasticity is obtained by the fact that the slot extends almost up to the ring limb of the thrust collar that faces away from the bearing shell. One preferred example of the ball joint contains a thrust collar with eight slots arranged within equal peripheral distance to each other.

A sufficient bracing of the thrust collar in the inner space of the joint housing is obtained by the fact that the ring limb is arranged in a right angle to the axial direction of the thrust collar. This forms stopping faces of the thrust collar, which are aligned at a right angle to the axial direction.

In one example of a ball joint with increased elasticity with which larger tolerances can be equalized, the ring limb of the thrust collar that faces away from the bearing shell extends generally at a right angle to the ring web.

The thrust collar is advantageously retained in the joint housing by a tension ring that is inserted into an annular groove extending in the surface of the inner space of the joint housing. This form of construction can be particularly easily mounted in an automated manner.

It is suggested that the tension ring also be made of steel, so that the tension ring does not represent any stress to the environment by the disposal of defective or worn-out ball joints.

BRIEF DESCRIPTION OF THE DRAWINGS

Further details and advantages are outlined in the following description of the assigned drawings, in which a preferred example of the invention is illustrated. The drawings show.

DESCRIPTION OF PREFERRED EMBODIMENTS

Figure 1:
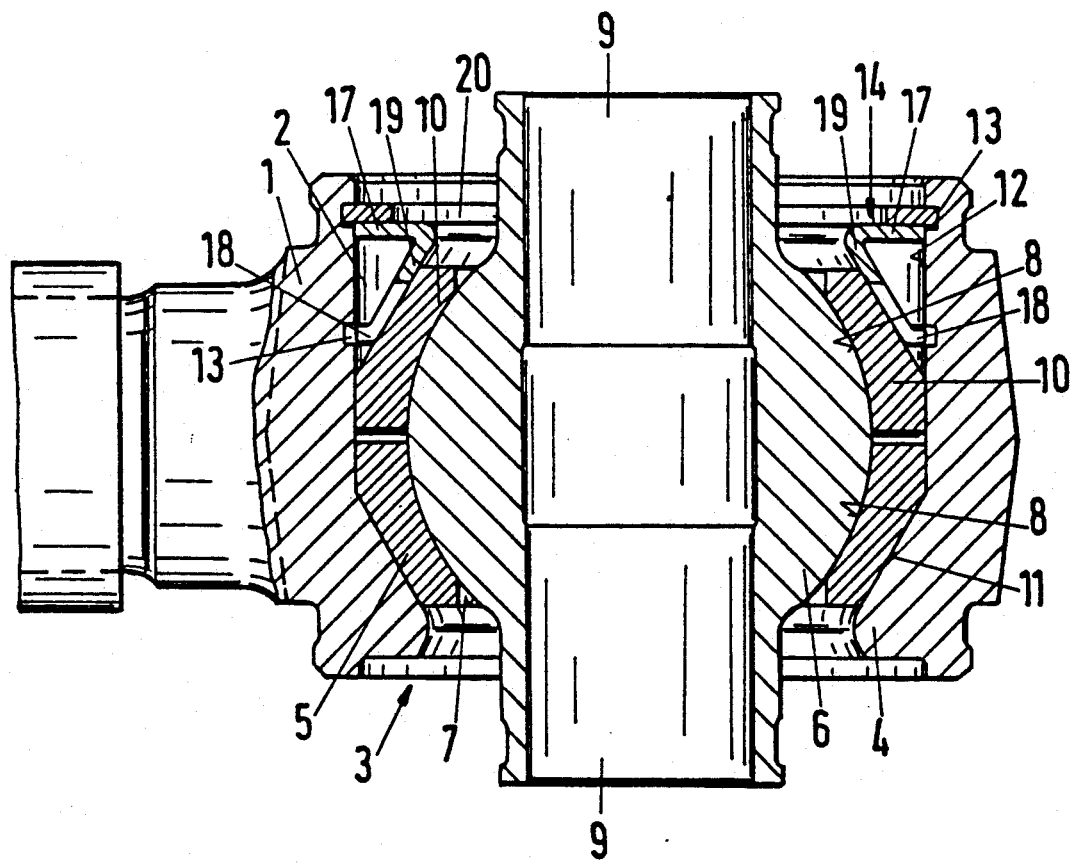
FIG. 1 a longitudinal section through a ball joint.

The ball joint has a joint housing (1) with a cylindrically shaped inner space (2) whose end area (3) is provided with a conically constructed stop (4) that adjoins a first bearing-shell half (5).

One ball (6) is inserted into the cylindrically shaped inner space (2) of the bearing housing, whereby the outer surface (7) of the ball adjoins the slide surface (8) of the first bearing-shell half (5). A second bearing-shell half (10), whose slide surface (8) also adjoins the outer IL surface (7) of the ball (6), is attached to the ball (6) above the first bearing-shell half (5), whereby the ball is provided with attached pins (9).

The bearing shell halves (5 and 10) have the shape of a spherical shell, so that the outer surface (11) of the upper bearing shell (10) is arranged at angle β to the surface (12) of the inner space (2) of the axially extended joint housing (1). The surface (12) is provided with two annular grooves (13).

A thrust collar (14) is arranged between the outer surface (11) of the bearing-shell half (10) and the surface (12) of the inner space (2) of the joint housing, whereby the thrust collar is constructed as an elastic metal ring.

The thrust collar (14) has a U-shape and two ring limbs (17,18) that form one stopping face (15,16) each (compare with FIG. 4 to 7) and a ring web (19) that connects the ring limbs (17,18) to each other. The ring limb (18) interlocks in the lower groove (13), so that the thrust collar (14) which is constructed as a steel ring, is retained in a stationary manner in the axial direction of the joint housing (1). The contact surface (15) of the thrust collar (14) adjoins a tension ring (20), which produces the bracing of the bearing-shell halves (5,10) and the ball (6). The tension ring (20) is also constructed as a steel ring and inserted into the upper groove (13). The desired bracing of the ball joint is obtained by the construction of the thrust collar (14).

Figure 2:
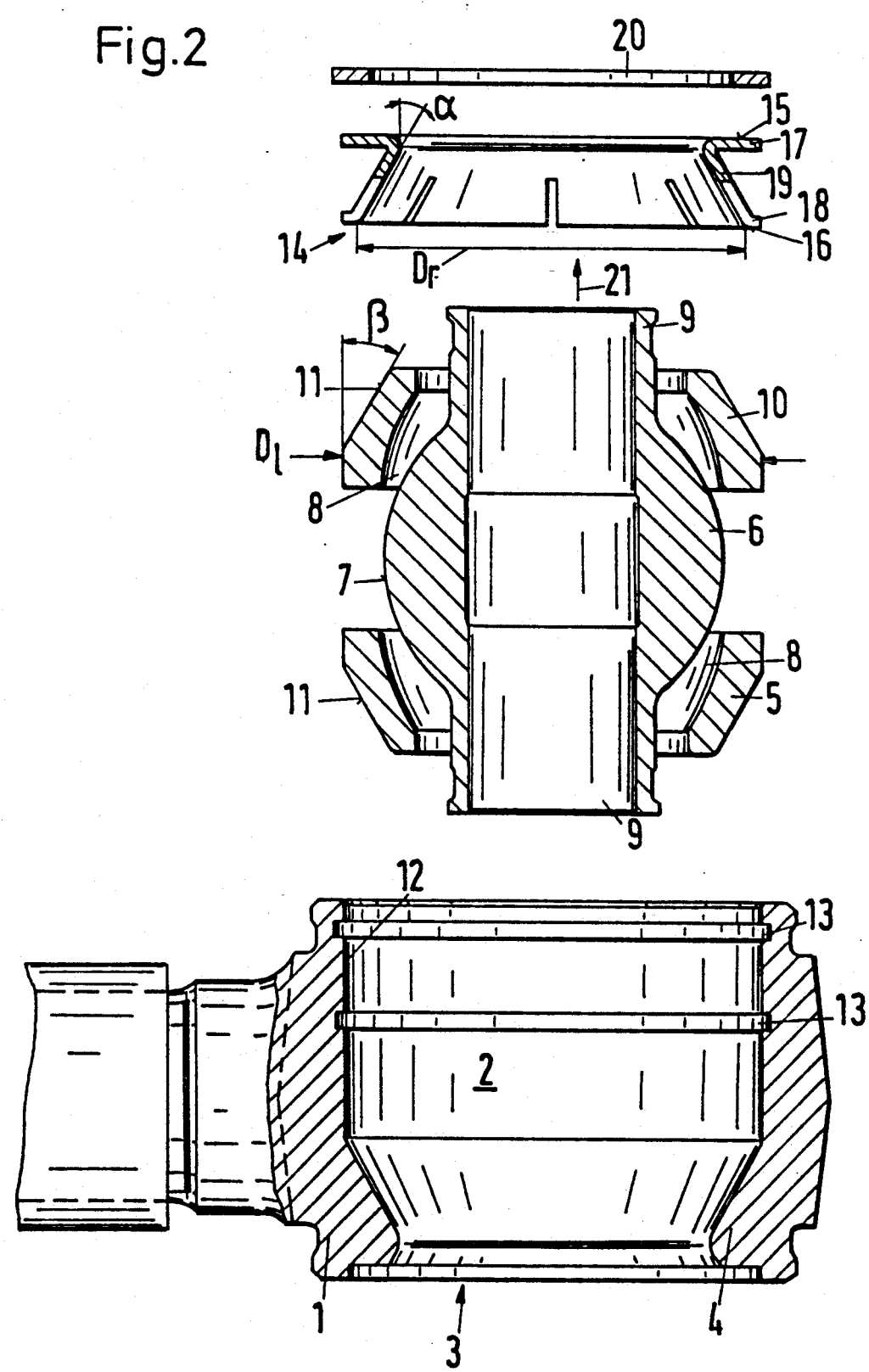
FIG. 2 an exploded view of a ball joint according to FIG. 1, in longitudinal section.
Figure 3:
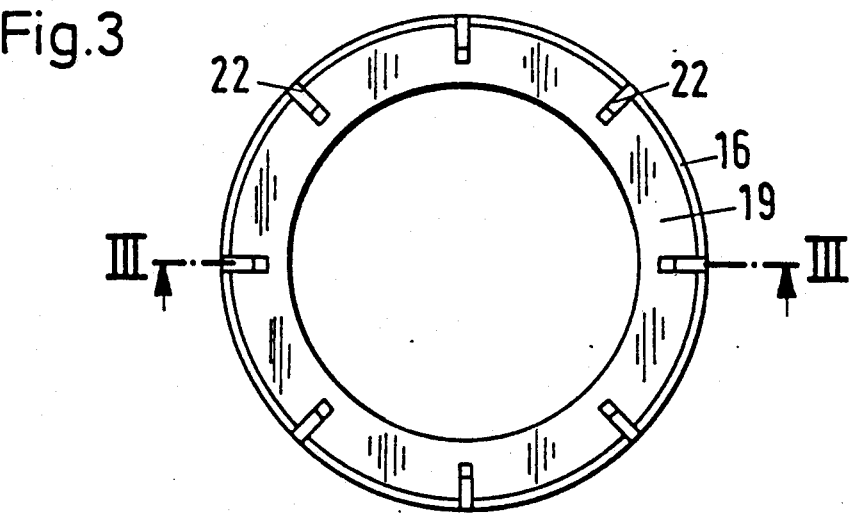
FIG. 3 a top view of a thrust collar.

FIGS. 3-7 illustrate different examples of the thrust collar (14), whereby FIG. 3 illustrates a top view of the tension ring (14) in a viewing angle that corresponds to the arrow (21) in FIG. 2. The annular thrust collar has a U-shaped cross section as previously described, whereby the two ring limbs (17, 18) have one stopping face (15,16) each. The ring web (19) provided between the ring limbs (17,18) is arranged at angle o to the axial direction of the thrust collar, whereby this angle α fluctuates slightly from the angle B between the axial direction and the outer surface (11) of the bearing-shell half (10). The angle α is slightly larger than the angle β, whereby the difference between these angles amounts to approximately 1°. In the example illustrated in the drawing, the angle β is 29° and the angle α is 30°. The diameter $D_r$ of the thrust collar (14) is smaller than the inner diameter $D_1$ of the bearing-shell half (10), so that the thrust collar (14) is expanded and braced during attachment onto the bearing-shell half (10).

The thrust collars (14) illustrated in FIGS. 4-7 have a number of slots (22) on their ends that face the bearing-shell half (10) extending in the axial direction. FIG. 3 clearly shows that the thrust collars have 8 slots, arranged within the same distance to each other, whereby the angle between two adjacent slots (22) is 45° each. The slots (22) increase the required elasticity of the thrust collar (14) in the axial, as well as the radial, direction. In the example of the thrust collar (14) illustrated in FIG. 6, the slots (22) extend almost to the stopping face (15) of the thrust collar (14) formed by the ring limb (17) that faces away from the bearing shell half (10). The longer slots (22) increase the elasticity in the axial, as well as the radial, direction.

Figure 4:
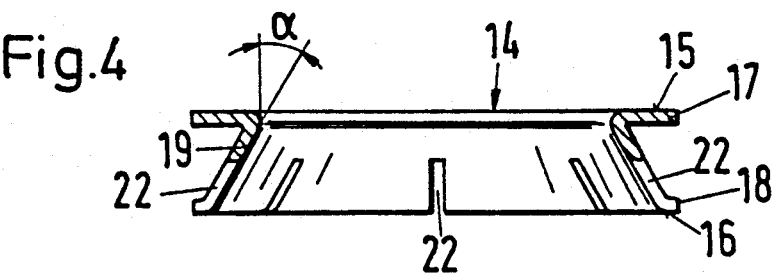
FIG. 4 a first example of the thrust collar according to FIG. 3, in longitudinal section along the line III—III in FIG. 3.
Figure 5:
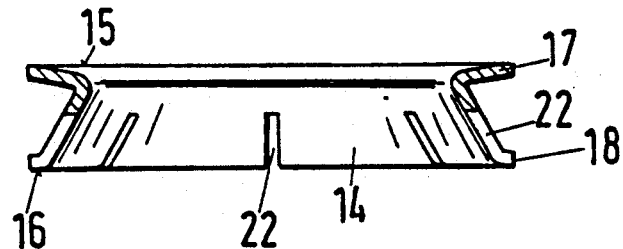
FIG. 5 a second example of the thrust collar according to FIG. 3, in longitudinal section along the line III—III in FIG. 3.
Figure 6:
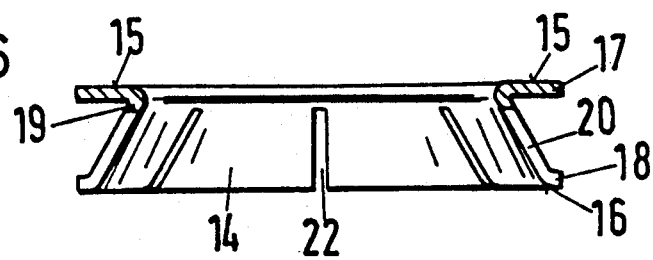
FIG. 6 a third example of the thrust collar according to FIG. 3, in longitudinal section along the line III—III in FIG. 3.
Figure 7:
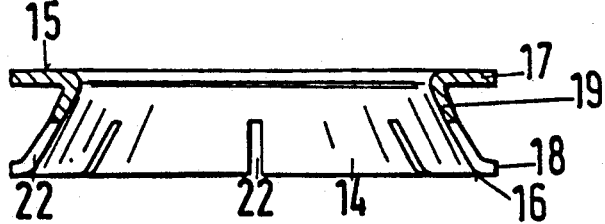
FIG. 7 a fourth example of the thrust collar according to FIG. 3, in longitudinal section along the line III—III in FIG. 3.
Figure 8:
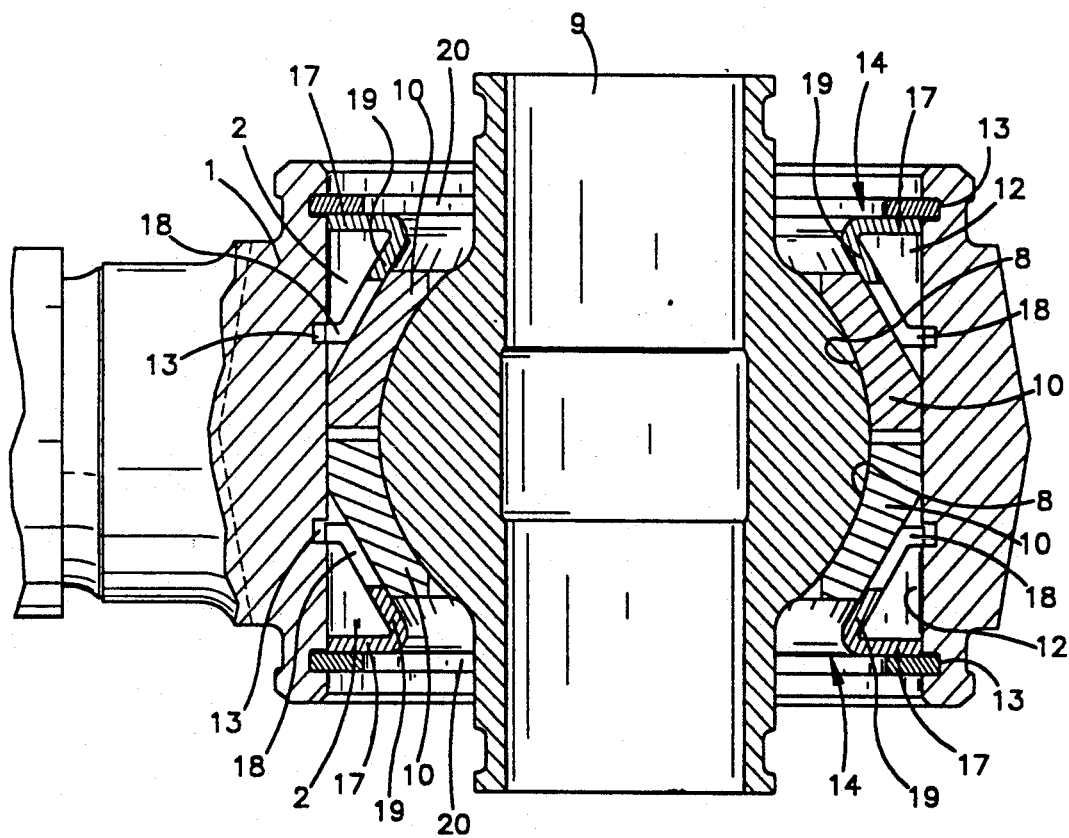
FIG. 8 a longitudinal section through a ball joint showing two thrust collars arranged on the opposing ends of he joint housing.

In the examples of the thrust collars (14) illustrated in FIGS. 4, 6 and 7, the stopping face (15) is arranged at a right angle to the axial direction of the thrust collar (14). FIG. 5 illustrates an example of the thrust collar in which the ring limb (17) of the thrust collar (14) that faces away from the bearing-shell half (10) is bent upward in the axial direction, so that the ring limb (17) that forms an elastic zone extends at a right angle to the ring web (19) arranged at angle α. This thrust collar (14) is particularly suitable for the equalization of larger tolerances between the joint housing (1) and the ball (6).

FIG. (7) illustrates a further example of a thrust collar (14), whereby this thrust collar (14) is provided with a convex ring web (19) between the ring limbs (17,18). In this particular example, the function of the difference between angle α and β is fulfilled by the convex shape of the ring web (19).

FIG. (8) illustrates being retained by thrust collars (14) that are made of steel and are arranged on opposing ends of the cylindrical inner space (2) of the joint housing.

I claim:

1. A ball joint comprising:
   a joint housing (b) defining an inner space (2) having an axial length and an axis along its axial length;
   a ball (b) disposed in the inner space of the joint housing;
   at least one bearing shell (5, 10) having an outer surface (11) and disposed between the joint housing and the ball, the bearing shell having an axis parallel to the axis of the inner space of the joint housing; and
   at least one thrust collar (14) having inherent elasticity and disposed between the joint housing and the bearing shell, the thrust collar having a portion for applying force to the outer surface of the bearing shell to brace the bearing shell, the force having a first component which acts axially of the bearing shell and a second component which acts perpendicular to the axis of the bearing shell, the portion including an end of the thrust collar which encircles the bearing shell and engages the bearing shell, the end of the thrust collar having a number of spaced apart axially extending slots (22) which define spaced apart collar portions, the collar portions engaging the outer surface of the bearing shell and applying the force to the outer surface of the bearing shell; and
   the thrust collar being a formed elastic metal profile ring including (i) a ring web (19) forming a contact surface and arranged at a first angle (α) relative to the axial direction of the inner space of the joint housing, and (ii) two ring limbs (17, 18) bent radially outward from the ring web and within an axial distance to each other, the force bracing the bearing shell being applied through the ring limbs in such a way that bracing of the bearing shell is influenced by the inherent elasticity of the thrust collar.

2. A ball joint according to claim 1 wherein the thrust collar (14) is made of steel.

3. A ball joint according to claim 1 wherein the inner space (2) of the joint housing (1) is cylindrically-shaped over part of its axial length, the inner space having a conical shape at one end area (3), the at least one bearing shell including a first bearing-shell half (5) having a correspondingly conical surface adjoining the one end area of the inner space, the ball (6) being braced with the thrust collar (14) at an axially opposite end area of the inner space, the at least one bearing shell including a second bearing-shell half (10) disposed between the ball and the thrust collar.

4. A ball joint according to claim 3 wherein annular grooves (13) are formed along an inner periphery (12) of the inner space (2) of the joint housing (1), at least one ring limb (18) of the thrust collar (14) interlocking at a free end into the annular grooves.

5. A ball joint according to claim 1 wherein the inner space (2) of the joint housing (1) is cylindrically-shaped and the ball (6) is retained by two thrust collars (14) made of steel, the two thrust collars being arranged on axially opposite end areas of the cylindrical inner space of the joint housing.

6. A ball joint according to claim 5 wherein annular grooves (13) are formed along an inner periphery (12) of the inner space (2) of the joint housing (1), at least one ring limb (18) of the thrust collar (14) interlocking at a free end into the annular grooves.

7. A ball joint according to claim 1 wherein the first angle (α) slightly fluctuates from a second angle (β) defined between the axial direction of the inner space (2) of the joint housing (1) and the outer surface (112) of the bearing shell (10).

8. A ball joint according to claim 7 wherein the first angle (α) is slightly larger than the second angle (β).

9. A ball joint according to claim 8 wherein the difference between the first and second angle (α, β) is 1°.

10. A ball joint according to claim 1 wherein the slots (22) extend almost all the way to the ring limb (17) of the thrust collar (14) that is farther away from the bearing shell (5, 10).

11. A ball joint according to claim 10 wherein the thrust collar (14) has eight slots (22) arranged within equal peripheral distance from each other.

12. A ball joint according to claim 1 wherein the thrust collar (14) has eight slots (22) arranged within equal peripheral distance from each other.

13. A ball joint according to claim 1 wherein the ring limbs (17, 18) are arranged at a right angle to the axis of the bearing shell (5, 10).

14. A ball joint according to claim 1 wherein the ring limb (17) of the thrhust collar (14) that is farther away from the bearing shell (5, 10) extends at a right angle to the ring web (19).

15. A ball joint according to claim 1 wherein the ring web (19) of the thrust collar (14) arranged between the ring limbs (17, 18) has a convex shape.

16. A ball joint according to claim 1 further including a tension ring (20) inserted into an annular groove (13) extending along a surface (12) of the inner space (2) of the joint housing (1), the tension ring acting to retain the thrust collar (14) in the joint housing.

17. A ball joint according to claim 10 wherein the tension ring (20) is made of steel.

* * * * *

UNITED STATES PATENT AND TRADEMARK OFFICE
CERTIFICATE OF CORRECTION

PATENT NO. : 5,230,580
DATED : July 27, 1993
INVENTOR(S) : Gunther Henkel

It is certified that error appears in the above-indentified patent and that said Letters Patent is hereby corrected as shown below:

Column 5, line 39, change "(b)" to --(1)--.

Column 5, line 41, change "(b)" to --(6)--.

Column 5, line 67, change "(11)" to --(ii)--.

Column 6, line 36, change "(112)" to --(11)--.

Column 6, line 55, change "thrhust" to --thrust--.

Column 6, line 66, change "10" to --16--.

Signed and Sealed this

Eighth Day of March, 1994

Attest:

BRUCE LEHMAN

Attesting Officer

Commissioner of Patents and Trademarks